Patented Nov. 22, 1932

1,888,921

UNITED STATES PATENT OFFICE

HERMAN L. HARTENSTEIN, OF CHICAGO, ILLINOIS

METHOD OF MANUFACTURING FERTILIZER

No Drawing.  Application filed October 18, 1926. Serial No. 142,191.

It is one of the objects of the present invention to not only produce manure or fertilizer, but to produce direct nitrate salt which is available as plant and crop food, all of which may be accomplished without extracting or separating the plant food from the native peat or muck which is used as a base in the present method.

Peat or muck in their native or natural state are usually associated with approximately eight or nine times their weight of water. The average nitrogen content is about two percent while many peats or mucks contain more than this quantity, which is organic and insoluble and generally said to be unavailable for immediate use for food by plants.

One of the outstanding problems in connection with the use of peat for agricultural or manufacturing purposes in an economically feasible manner heretofore has been the removal of water and the conversion of its nitrogen contents into a soluble plant food by a practical method, and at a cost that is economical to the farmer, which is a matter of equal importance.

Acidity is a condition of or common to many types of peat in the bog or swamp, due to the presence of carbon dioxide and colloidal substances of an acid character.

The present invention further contemplates the use of muck or peat, as in many sections in its native state it contains large quantities of carbonic acid frequently in excess of 3%, and also contains humus or organic matter which carries with it a large percentage of nitrogen usually running from 2% to 4%, as well as available hydrogen, approximately from 3% to 5%, and in not only obtaining or utilizing the organic nitrogen or potential ammonia contained therein, but in also utilizing the hydrogen, by means of certain forms of iron in the presence of water, air, nitrogen, hydrogen, oxygen and acids in contact with the humus, organic or vegetable compounds contained in the peat or muck which not only serve the purpose of bringing about, aiding or effecting the required chemical reaction to produce ammonia, but the iron compounds, organic matter and water and their chemical changes are also utilized to form additional ammonia to the amount of potential ammonia contained in the native peat or muck.

In other words, in a direct, efficient and economical manner without great financial investment for apparatus and plant the native peat may be converted into fertilizer.

The present invention further contemplates putting in an available form, hydrogen and nitrogen which exist and which in their natural organic condition have heretofore been unavailable, and adding thereto atmospheric nitrogen.

A further object is to provide an improved method of this character embodying the introduction of semi-pyrophoric or finely divided iron, which is more particularly described and claimed in my co-pending application Serial No. 142,190, Patent 1,819,164, August 18, 1931.

A still further and a most important object of this invention is to take advantage of and employ the large quantity of water present in peat or muck to good and useful purposes in an economical and efficient manner at a minimum cost, in the natural or native state of the material, the presence of such quantity of water being heretofore held to be useless and detrimental in the former processes for the utilizing of muck or peat.

In carrying this invention into operation the preferred method is preferably carried out in substantially the following manner.

The first step in the method is preferably the introduction or mixing of the semi-pyrophoric or finely divided iron with the peat or muck which may be accomplished in the best, cheapest and simplest suitable manner, it being understood that any suitable apparatus or container may be employed for the purpose.

The muck or peat is employed in this improved method on account of its availability and vast quantities, the great water holding and retaining properties thereof as well as the presence of the humus compounds, organic matter, nitrogen and available hydrogen contained in the peat or muck. When the process is started air is admitted or introduced into the watery mixture, mass, or solution.

It is understood that in general the residual or resultant iron compound is a useful addition to the soil and will not injure plant life, but does in fact oxidize organic matter, converting carbon into carbonic acid, and helps to impart a green, healthy color to plants and growing crops. Should there, however, be present any excess of sulphate of iron, the presence of a slight excess of ammonia in the solution, or the addition of a little potassium bearing material in solution, during or after the sulphating process or step, will convert the sulphate of iron into hydrated oxide of iron which is in no manner harmful to plant life.

The compound may be then dried and ground in any suitable manner after which it is then ready for use. If no potassium bearing material has been used, a small amount of limestone, marl, or pulverized phosphate rock may be added, but this is not essential unless there is an excess of acid present, or a small amount of the pyrophoric iron may be added.

With this improved process clean iron filings, borings, etc., which are turned out as practically waste, by machine shops, may be employed in lieu of the semi-pyrophoric or finely divided iron, and mixed with the wet peat or muck which contains carbonic acid in the watery solution, but the action of the iron is slower. In the event that the iron filings are oily or greasy, it is to be understood that the oil or grease must be removed therefrom without oxidation, before the filings, etc., are used in this method.

This improved method or process may be briefly stated to be as follows.

Dredge, shovel or pump the peat or muck from the bog, add the iron, then if desired a small quantity of nitrate of soda may be added, then introduce the oxidized fumes of sulphur into the composition to form other fertilizing compounds. Then if desired the resulting compound may be used in any suitable manner.

In the event, however, that there is too much of an excess of water present with the peat or muck, that is a quantity in excess of the amount required for the formation and absorption of the ammonia, then the mass may, if desired, be drained of the superfluous liquid, in any suitable manner, then add the sodium nitrate and oxidized sulphur fumes and acidulous products resulting from their action upon or with water, peat or muck and air, to the drainage liquid if it contains any ammonia, to form the ammonium sulphate, after which the resultant liquid may be evaporated and the solid matter remaining is delivered over the mass of peat or muck to combine therewith and to be absorbed by the porous mass, adding thereto additional ammonium sulphate, then allow it to have air, the reactions referred to increase the temperature sufficiently, and then aerate, etc., if desired. Any suitable apparatus or container may be employed for this purpose.

The iron residuum, if any, left in this process is not harmful to vegetation, but is helpful to many soils inasmuch as there is an insufficiency thereof, owing to the action of humus or vegetable matter undergoing changes or combinations of a chemical and physical nature in the soil.

During the sulphating stage of this process when sulphur is burned the sulphurous and hydrogen sulphide gases in contact with the organic matter of the peat or muck, air, moisture, and the pyrophoric iron to form fertilizer containing compounds, but in this case additional oxidized sulphur should be simultaneously added while the mass is being evaporated, dried or heated.

Sulphur is burned in an ordinary sulphur burner with atmospheric air, and the oxidized gases, nitrogen and other gases are formed and absorbed by the mixed mass or muck, water and iron. If desired some peat or muck may be added and burned with the sulphur in the burner, in which case the gaseous products are oxidized sulphur and hydrogen sulphide together with nitrogen and air with oxygen. The gases as they leave the burner are conveyed to and into the wet peat and water, and if additional oxygen is required, air may be blown into the mixture whereby the sulphurous or sulphuretted gases or both abstract oxygen from the air and in consequence thereof the ammonium compounds previously formed are fixed. The air is then shut off and if desired an additional quantity of iron may be added to the mass and thoroughly mixed.

In decompositions of the iron, peat and water, ammonium and iron compounds are formed, the latter by the addition of air at this stage, and in the presence of the organic material, is converted into hydrated oxides of iron. If desired, after fixing the ammonia the introduction of oxidized sulphur gases may be continued to form any desired excess of acid and by then adding phosphate rock or the like, the latter will be acidulated and converted into super-phosphate.

In carrying out this process, if an excess of ammonia is present and lime (calcium oxide (CaO)) is added to the composition a portion of the free ammonia will be converted into a nitrate of calcium.

If an excess of ammonium is present or is added and if iron sulphate is present, the ammonia will convert the iron sulphate into the oxide form.

It is thought that the operation of the process will be clearly understood but briefly stated the invention consists in a process of treating peat or muck for the production of fertilizer.

The process is of a general nature and is applicable to various qualities of peat or muck except that in the latter, its fiber is largely destroyed by weathering, which is natural to some deposits, while in others of the more fibrous peats or such as may contain a considerable quantity of rootlets it should be placed on a pile till the fibres and rootlets are largely decayed by the weather, so that it is generally known as muck.

In the practical working of this invention it is preferably conducted in substantially the following manner, it being understood that the peat or muck to be utilized are first removed from the deposit or stock pile as the case may be, and then treated in a proper container, receptacle or bin, into which the semi-pyrophoric or finely divided iron together with the peat or muck is mixed or introduced in the best and most economical manner.

The mixture is then treated with the oxidized fumes of free or native sulphur, as produced in any ordinary sulphur burning furnace, in conjunction with atmospheric air.

During the introduction of the oxidized fumes of sulphur, air is introduced for the purpose of adding its component gases to the mixture under treatment.

Should any undesirable excess of sulfate of iron be formed it may be corrected by the addition of a potash bearing material.

In the event that the resultant product contains any sulfides or sulfites I prefer to add limestone or marl both of which are calcium bearing materials.

Owing to the wide variation in peat deposits no exact quantities can be given. However, with the peat on a pile-dry basis, I have found that the proportions of peat or muck used may be 1600 pounds and pyrophoric or finely divided iron 200 pounds, it being understood that such details will vary and are usually under proper chemical control.

The resultant product is finally run through a dryer and is then ground if desired for use in fertilizer distributing machinery.

What is claimed as new is:—

1. The method of manufacturing fertilizer from a material of the group consisting of muck and peat in their natural state which comprises adding to said material finely divided iron, and digesting said mixture with sulphur oxide gases.

2. The method of manufacturing fertilizer from a material of the group consisting of muck and peat in their natural state which comprises adding to said material finely divided iron, digesting said mixture with sulphur oxide gases, and then adding calcium bearing material to the mass.

3. The method of manufacturing fertilizer from a material of the group consisting of muck and peat in their natural state which comprises adding to said material finely divided iron, digesting said mixture with sulphur oxide gases, then adding calcium bearing material, and then introducing air into the mass.

4. The method of manufacturing fertilizer from a material of the group consisting of muck and peat in their natural state which comprises adding to said material finely divided iron, then treating the mixture with potted oxides of sulphur, and then adding a calcium bearing material.

5. The method of manufacturing fertilizer from a material of the group consisting of muck and peat in their natural state which comprises adding to said material finely divided iron, and then treating the mixture with the oxide fumes of free or native sulphur.

In testimony whereof I have signed my name to this specification, on this 30th day of September, A. D. 1926.

HERMAN L. HARTENSTEIN.